No. 851,172. PATENTED APR. 23, 1907.
G. KARRMANN.
SWIVEL SNAP HOOK.
APPLICATION FILED DEC. 11, 1906.
*Fig.1.*
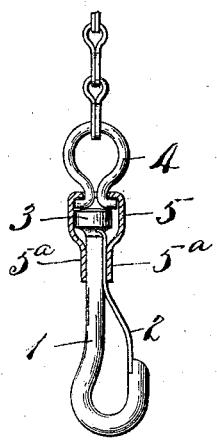
*Fig.2.* *Fig.4.* *Fig.3.*
 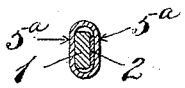 
*Fig.5.*
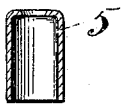
Witnesses
Chas. Weard
Langdon Moss
Inventor
GEORGE KARRMANN
By his Attorneys
Bartlett Brownell Mitchell
THE NORRIS PETERS CO., WASHINGTON, D. C.

UNITED STATES PATENT OFFICE.

GEORGE KARRMANN, OF UNIONVILLE, CONNECTICUT, ASSIGNOR TO CORBIN SCREW CORPORATION, OF NEW BRITAIN, CONNECTICUT, A CORPORATION OF CONNECTICUT.

SWIVEL SNAP-HOOK.

No. 851,172.     Specification of Letters Patent.     Patented April 23, 1907.

Application filed December 11, 1906. Serial No. 347,251.

*To all whom it may concern:*

Be it known that I, GEORGE KARRMANN, a citizen of the United States, residing at Unionville, county of Hartford, Connecticut, have invented certain new and useful Improvements in Swivel Snap-Hooks, of which the following is a full, clear, and exact description.

My invention relates to improvements in swivel snap hooks, the object being to provide a simple, inexpensive, effective and durable construction.

In the accompanying drawings, Figure 1 is a side elevation of my invention partly broken away to show the internal construction. Fig. 2 is a front elevation of the hook. Fig. 3 is a similar view of the spring. Fig. 4 is a cross section. Fig. 5 is a vertical section of a detail of construction.

1 is the hook member.

2 is the spring secured to the shank of the hook 1, the free end bearing under the bill of the hook in the usual manner.

3 is a head at the inner end of the shank of the hook. This head is enlarged and preferably bulbous.

4 is a swivel ring.

5 is a cap or union member by which not only is the spring 2 held to the shank of the hook, but the swivel ring 4 is likewise connected to the several parts in such a manner as to permit of a swiveling action.

The shank of the hook 1 immediately below the head 3 is flattened down. Against the flat face of this shank the spring 2 is rigidly clamped in the manner hereinafter described. The cap 5 is tubular in form. When the parts 1—2 are assembled, the cap (with the ring 4 therein) may be applied by sliding it over the bulbous head 3. The opposite sides 5ª—5ª of cap 5 are then flattened down so as to rigidly clamp and embrace the parts 1—2 immediately under the head 3. The ring 4 is formed preferably of wire, the free ends thereof being curved or hooked outwardly, as best seen in Fig. 1. This part of the swivel ring 4 projects into a contracted passage in the upper end of the cap 5, so that when the several parts are assembled they are all held firmly against accidental separation, and yet the hook may turn freely without revolving the ring 4. The article is, therefore, useful in any connection where snap hooks may be employed to advantage, for example, for chains for hitching animals and the like.

What I claim is:

1. A snap hook comprising, a hook portion, the body or shank thereof being flattened, a head portion at the end of said shank, a spring arranged to cooperate with the bill of the hook and supported upon the shank thereof, a swivel ring, and a single device arranged to secure the spring and the hook rigidly together and to hold the swivel ring in place adjacent the head of the hook.

2. In a snap hook, a shank, a bulbous head thereon, a cap piece embracing said head and secured to said shank below the same, said cap projecting above said head to form a swivel ring receiving space, a swivel ring, a portion thereof projecting into said swivel ring receiving space and being retained therein by the overlying walls of the cap.

3. A snap hook comprising a hook portion having a flattened shank, a head, a spring a cap enclosing said head and snugly embracing said spring and shank, a swivel ring passing into the upper end of said cap, and means for retaining the same therein.

4. In a device of the character described, a hook having a shank, an enlarged head at the end of said shank, a spring bearing on said shank, the free end of the same cooperating with the bill of the hook, a tubular cap overstanding the headed end of the shank and the adjacent end of the spring and securing the latter in place, and a ring loosely connected with said cap piece to permit of a swiveling movement between said ring and hook.

GEORGE KARRMANN.

Witnesses:
GEORGE E. TAFT,
S. N. WADSWORTH.